(12) United States Patent
Weber

(10) Patent No.: US 8,014,053 B2
(45) Date of Patent: Sep. 6, 2011

(54) METHOD FOR GENERATING A UNIVERSAL PINHOLE PATTERN FOR USE IN CONFOCAL MICROSCOPES

(75) Inventor: Mark A. Weber, Moers (DE)

(73) Assignee: NanoFocus AG, Oberhausen (DE)

( * ) Notice: Subject to any disclaimer, the term of this patent is extended or adjusted under 35 U.S.C. 154(b) by 518 days.

(21) Appl. No.: 12/226,397

(22) PCT Filed: Apr. 12, 2007

(86) PCT No.: PCT/DE2007/000637
§ 371 (c)(1),
(2), (4) Date: Oct. 17, 2008

(87) PCT Pub. No.: WO2007/121706
PCT Pub. Date: Nov. 1, 2007

(65) Prior Publication Data
US 2009/0207468 A1  Aug. 20, 2009

(30) Foreign Application Priority Data
Apr. 20, 2006  (DE) .......................... 10 2006 018 720

(51) Int. Cl.
*G02B 26/02* (2006.01)
(52) U.S. Cl. ......... 359/235; 359/234; 359/368; 359/385

(58) Field of Classification Search ................... 359/234, 359/235, 368, 385
See application file for complete search history.

(56) References Cited

U.S. PATENT DOCUMENTS
4,802,748 A  2/1989  McCarthy et al.
5,083,220 A  1/1992  Hill

FOREIGN PATENT DOCUMENTS
EP  0 539 691  5/1993

OTHER PUBLICATIONS

International Search Report.
Tanaami, T. et al., "High-Speed 1-Frame/MS Scanning Confocal Microscope with a Microlens and Nipkow Disks," Applied Optics, vol. 41, No. 22, Aug. 2002. XP-001131422 (ISR).

*Primary Examiner* — Joshua L Pritchett
(74) *Attorney, Agent, or Firm* — Collard & Roe, P.C.

(57) ABSTRACT

The invention relates to a pinhole disk, which can be used in a transmitted light mode as a filter disk, in particular in confocal microscopes, and consists of an optically transparent material with an inner hole having a fixed outer radius $r_{max}$ and inner radius $r_{min}$. The optically transparent material is covered with a non-transparent layer, at least over a large area, the area being provided with a pattern of transparent pinholes. The pinholes are arranged according to a rule, in such a way that a quasi-uniform point density is obtained on the disk.

4 Claims, 2 Drawing Sheets

Figure 1:
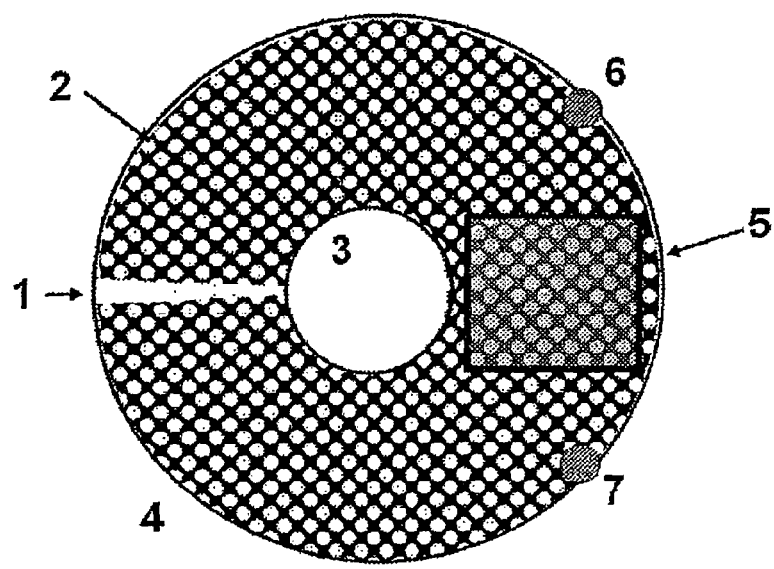

METHOD FOR GENERATING A UNIVERSAL PINHOLE PATTERN FOR USE IN CONFOCAL MICROSCOPES

CROSS REFERENCE TO RELATED APPLICATIONS

This application is the National Stage of PCT/DE2007/000637 filed on Apr. 12, 2007, which claims priority under 35 U.S.C. §119 of German Application No. 10 2006 018 720.2 filed on Apr. 20, 2006. The international application under PCT article 21(2) was not published in English.

The method described here serves for universal generation of an optimized pinhole pattern on rotating confocal filter disks. Using this method, new types of pinhole patterns can be generated, which demonstrate significantly lower demands on adjustment, imbalance, and synchronization as compared with the Nipkow disks used until now. In contrast to the Nipkow disks used until now, the pinhole density remains constant over the entire disk radius. Thus, no additional brightness wedge occurs towards the side of the image; this could have a negative influence on the dynamics of the system. It was also possible to eliminate the problems of incorrect adjustment, i.e. maladjustment as the result of mechanical imbalance, which led to an additional light/dark stripe pattern. In addition, it was possible to alleviate the problem of targeted synchronization between the speed of rotation of the disk and the exposure time of the image-recording module. In addition to these properties, a special region for generating a non-confocal overview image was created.

However, this (wedge-shaped) region can also be provided in the case of usual confocal filter disks (Nipkow disks, for example), and is not restricted to the new type of pinhole arrangement according to the invention.

Operation of a confocal microscope that can switch between normal microscope mode and confocal mode, without any mechanical switching, is made possible for the first time with the invention described here. Independent of this, confocal operation without a unilateral decrease in intensity on the outside of the pinhole disk, low-stripe operation even in case of maladjustment or imbalance of the rotating disk, and simple synchronization to the exposure time of the image-recording module are made possible for the first time by this invention.

Figure 2:
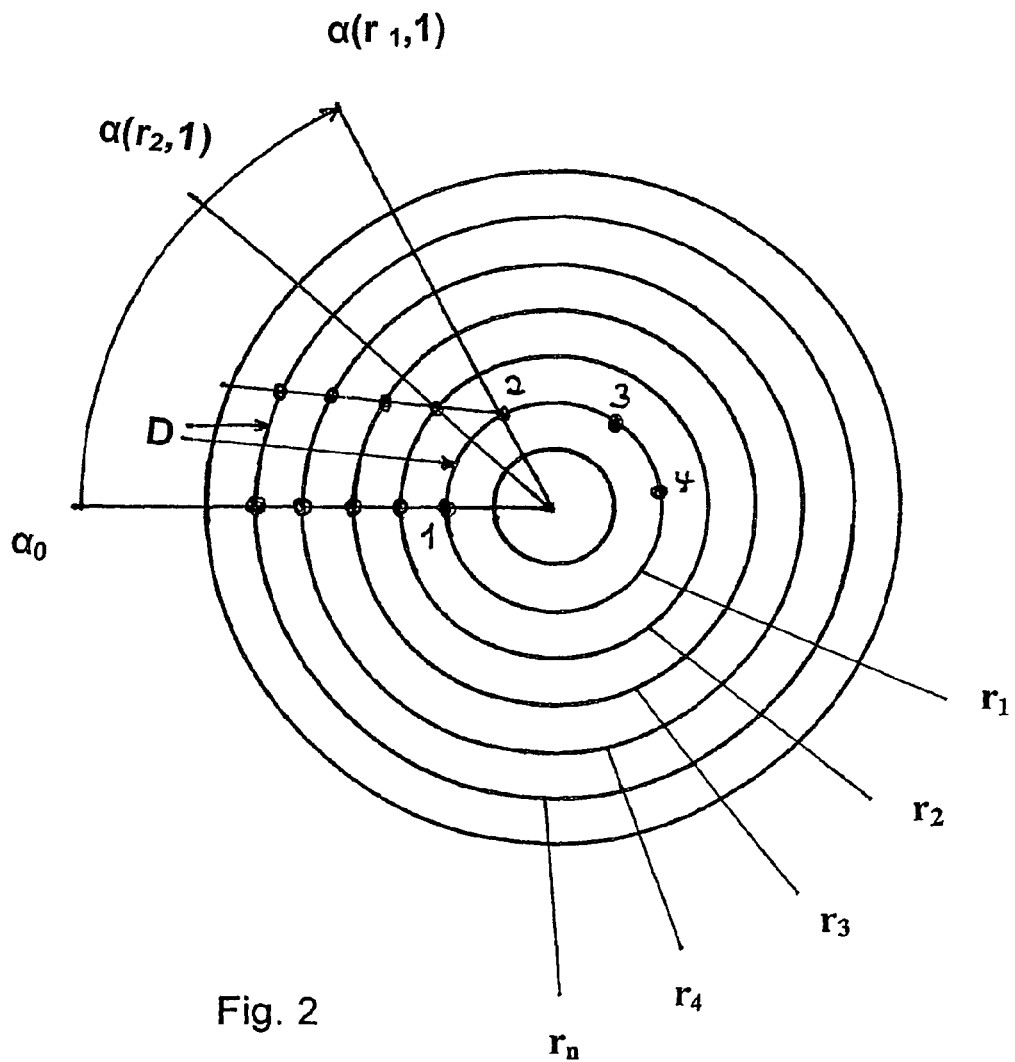
Figure 3:
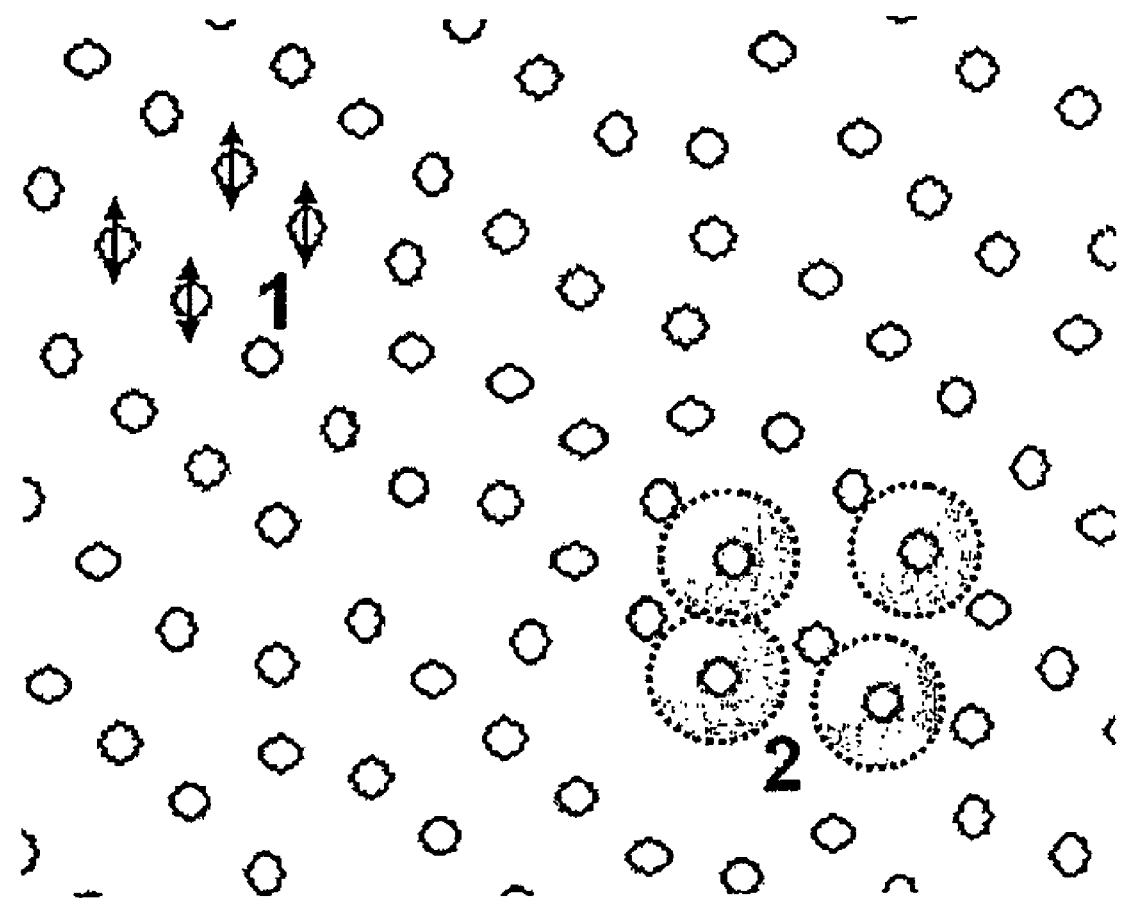

The drawing shows:

FIG. 1) fundamental sketch concerning the rough segmenting of the pinhole disk, FIG. 2) fundamental sketch concerning generation of the quasi-homogeneous pinhole density on the pinhole disk, FIG. 3) fundamental sketch concerning breaking of symmetries and adherence to the minimum distance between pinhole patterns on the pinhole disk.

FIG. 1 shows the fundamental sketch concerning rough segmenting of a pinhole disk that works in the transmitted light mode. The disk consists of an optically transparent material cut into a round shape, having an inner hole with a fixed outside radius $r_{max}$ (4) and inside radius $r_{min}$ (3). The optically transparent material is provided with a non-transparent (ND>3), specially structured layer. Aside from markings, such as angle, product number, and company name, for example, the structure is divided into two segments: 1.) A triangular transparent wedge (1) with a corner in the center point of the disk, to allow a microscopic overview image. 2.) The rest of the disk is provided with a quasi-homogeneous pinhole pattern of transparent pinholes. In this connection, a deterministic pinhole pattern (2) having guaranteed minimum distances between adjacent pinholes is to be generated, at first, which pattern is subjected to a suitable stochastic diffusion process, and subsequently is suitably corrected for adherence to a minimum distance between adjacent pinholes.

The disk rotates about its center point. Both the transparent wedge for the microscope overview mode and the pinhole pattern move through the image region (5) to be observed. The time point when the transparent wedge gets into the image area and leaves it again can be detected by means of two hybrid light barriers (6) and (7). Without any restriction in generality, let light barrier (6) give off a pulse shortly before the transparent wedge gets into the image field, and light barrier (7) give off a pulse when the transparent wedge leaves the image region. If the exposure of the image sensor begins at the time point (6) and ends at the time point (7), an overview image can be generated. If the exposure is started at the time point (7) and ended at the time point (6), a confocal image is recorded. If the exposure period is selected to be from time point (6) until the next pulse of (6), a combination image of confocal and overview mode can be recorded. This also works if pulse (7) is used. This method of procedure should have significantly better performance than previous methods, particularly for steep flanks and very low-light samples.

FIG. 2 shows a fundamental sketch concerning generation of the quasi-homogeneous point density on the pinhole disk. To generate the basic pattern, calculation takes place in cylinder coordinates, for the sake of simplicity, and the entire disk is divided into n circular rings having equal thickness, having the radii $r_1, r_2, r_3, \ldots, r_n$ having a constant radial distance $\Delta = (r_{max} - r_{min})/(n-1)$. The circular rings have their center point in the origin. A straight line that proceeds from the origin intersects all the circular rings at the angle $\alpha_0$. The first pinhole is placed, for every circle, at the intersection between the concentric circles and the half-line. The angle of the following pinhole center for every circle is calculated from the sum of the last angle and a summand $d\alpha(r_i)$ that is typical for the circle radius. The angle $d\alpha(r_i)$ is calculated in radians and turns out to be $d\alpha(r_i) = D^2/(\Delta \cdot r_i)$. All the angle positions of the pinholes are calculated according to the formula $\alpha(r_i, j) = \alpha_0 + j \cdot d\alpha(r_i)$, whereby only angles between 0 and $2\pi$ are taken into consideration. In this way, the basic geometry for a quasi-homogeneous distribution of the pinholes is created. In this connection, the number of pinholes distributed on the individual circles increases continuously, in whole numbers, with the circle radius, and cannot have any local minimums.

The distance between two adjacent pinholes on a circle, in each instance, is always constant on the circles, from the outside to the inside, so that the connection line of the pinholes adjacent to $\alpha_0$ is slightly curved.

FIG. 3 shows the fundamental sketch concerning breaking of the symmetry and concerning adherence to a minimum distance between adjacent pinholes. In this connection, no change in radius is carried out in any case. Angle coordinates are merely displaced.

(1) shows the possibilities concerning angle displacement of the pinholes. In this connection, an angle $\Delta\alpha$ is calculated by way of a random generator, which angle can displace up to maximally an average pinhole distance, positively or negatively, in other words $\Delta\alpha = [(-D/r_i) \ldots (D/r_i)]$. This displacement angle is newly generated for every pinhole, and added to its angle value. As a final step, angle displacements take place, which are supposed to guarantee a minimum distance for adjacent pinholes (2). In this connection, the minimum distance is supposed to amount to less than 90% of the average distance, in order to reduce the number of required displacements and to reduce the maximally required displacement angles. By way of the definition of diffusion segment and guaranteed minimum distance, the maximal displacement angle is supposed to be set in such a manner that a maximal displacement of not more than a few average pinhole distances results for every pinhole.

The invention claimed is:

1. Pinhole disk that can be used as a filter disk in transmitted light mode, particularly in confocal microscopes, and consists of an optically transparent material, having an inner hole with a fixed outside radius $r_{max}$ and inside radius $r_{min}$, whereby the optically transparent material is provided with a non-transparent layer at least in a large region, and this region is provided with a pattern of transparent pinholes, wherein the arrangement of these pinholes is generated according to the following rule:
   a. The disk is divided into n circular rings of equal thickness, having the radii $r_1, r_2 \ldots, r_n$, with a constant radial distance $\Delta r$,
   b. a straight line that proceeds from the disk origin intersects all the circular rings at the angle $\alpha_0$,
   c. the first pinholes are placed at every intersection of the concentric circles with the straight line,
   d. the angle of the next pinholes for each circle is calculated from the sum of the last angle and a summand $d\alpha(r_i)$ typical for the circle radius, where the angle $d\alpha(r_i)=D^2/(\Delta r \times r_i)$ is calculated in radians, causing all the angle positions of the pinholes to be calculated according to the formula $\alpha(r_i, j)=\alpha_0+j \times d\alpha(r_i)$, and only angles between 0 and $2\pi$ being taken into consideration, where the following applies:
   i=number of radii,
   D=distance between two pinholes on the same radius,
   j=number of pinholes on a circular ring.

2. Pinhole disk according to claim 1, wherein the angle coordinates of the pinholes, in each instance, are displaced in such a way that first, an angle $\Delta\alpha$ is calculated by way of a random generator, which can displace up to maximally an average pinhole distance, positively or negatively, in other words $\Delta\alpha=[(-D/r_i) \ldots (D/r_i)]$, whereby this displacement angle is newly generated for every pinhole, and added to its average value, and afterwards, as a final step, angle displacements take place, which guarantee a minimum distance for adjacent pinholes, whereby the minimum distance is supposed to amount to less than 90% of the average distance.

3. Pinhole disk according to claim 1, wherein a wedge-shaped region of the disk is transparent and unstructured, and the intersection of the wedge shanks coincides with the center of the disk.

4. Pinhole disk according to claim 3, wherein two hybrid light barriers (6, 7) are provided, which are connected with an image sensor of the microscope, in terms of pulses, and are provided for detection of the wedge passing through.

* * * * *